United States Patent
Heyrman et al.

(10) Patent No.: US 9,135,126 B2
(45) Date of Patent: Sep. 15, 2015

(54) MULTI-CORE RE-INITIALIZATION FAILURE CONTROL SYSTEM

(71) Applicant: International Business Machines Corporation, Armonk, NY (US)

(72) Inventors: Peter J. Heyrman, Rochester, MN (US); Stuart Z. Jacobs, Lakeville, MN (US); David A. Larson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 13/761,497

(22) Filed: Feb. 7, 2013

(65) Prior Publication Data

US 2014/0223225 A1    Aug. 7, 2014

(51) Int. Cl.
*G06F 11/00*    (2006.01)
*G06F 11/20*    (2006.01)
*G06F 11/22*    (2006.01)
*G06F 11/14*    (2006.01)

(52) U.S. Cl.
CPC .......... *G06F 11/202* (2013.01); *G06F 11/1402* (2013.01); *G06F 11/22* (2013.01)

(58) Field of Classification Search
CPC ........ G06F 11/004; G06F 11/22; G06F 11/28
USPC .......................................................... 714/11
See application file for complete search history.

(56) References Cited

U.S. PATENT DOCUMENTS

| | | | |
|---|---|---|---|
| 5,652,893 A | 7/1997 | Ben-Meir et al. | |
| 5,923,830 A * | 7/1999 | Fuchs et al. | 714/11 |
| 6,851,071 B2 * | 2/2005 | Bossen et al. | 714/5.11 |
| 7,159,152 B2 | 1/2007 | Von Wendorff | |
| 7,257,734 B2 * | 8/2007 | Vaidyanathan | 714/13 |
| 7,472,266 B2 * | 12/2008 | Kumar et al. | 713/1 |
| 7,673,113 B2 | 3/2010 | Sugumar et al. | |
| 7,797,512 B1 | 9/2010 | Cheng et al. | |
| 7,802,073 B1 | 9/2010 | Cheng et al. | |
| 7,849,286 B2 | 12/2010 | Sugumar et al. | |
| 7,895,426 B2 | 2/2011 | Holm et al. | |
| 7,937,615 B2 * | 5/2011 | Takamoto et al. | 714/10 |
| 7,941,699 B2 * | 5/2011 | Campini et al. | 714/13 |
| 8,078,824 B2 | 12/2011 | Sugumar et al. | |
| 8,219,788 B1 | 7/2012 | Cheng et al. | |
| 8,225,315 B1 | 7/2012 | Cheng et al. | |

(Continued)

OTHER PUBLICATIONS

IBM, "Autonomic Recovery of Thermal Management Monitoring Control System Failure", IP.Com Prior Art Database, IP.Com No. IPCOM000166951D, Published Jan. 29, 2008. http://www.ip.com/pubview/IPCOM000166951D.

(Continued)

*Primary Examiner* — Amine Riad

(74) *Attorney, Agent, or Firm* — Scott S. Dobson; Grant Johnson

(57) ABSTRACT

A method of a computer system recovering from a core re-initialization failure is described. The method may include automatically detect a core re-initialization failure during a core re-initialization process by a hypervisor. The hypervisor automatically determines whether the core re-initialization failure is a permanent failure. If the core re-initialization failure is a permanent failure, then automatically determine, by the hypervisor, which cores are re-initialized and which cores are indeterminate. Automatically allocate the re-initialized cores between one or more virtual machines by the hypervisor.

7 Claims, 5 Drawing Sheets

(56) References Cited

U.S. PATENT DOCUMENTS

| | | | |
|---|---|---|---|
| 8,281,308 B1 | 10/2012 | Cheng et al. | |
| 8,412,981 B2* | 4/2013 | Munoz et al. | 714/12 |
| 8,543,843 B1 | 9/2013 | Cheng et al. | |
| 8,793,528 B2* | 7/2014 | Sivaramakrishnan et al. | 714/4.11 |
| 2004/0163000 A1 | 8/2004 | Kuhlmann et al. | |
| 2006/0212677 A1* | 9/2006 | Fossum | 712/1 |
| 2008/0163239 A1 | 7/2008 | Sugumar et al. | |
| 2009/0055637 A1 | 2/2009 | Holm et al. | |
| 2009/0172471 A1* | 7/2009 | Zimmer et al. | 714/17 |
| 2009/0217092 A1 | 8/2009 | Weiberle et al. | |
| 2010/0088550 A1 | 4/2010 | Imai et al. | |
| 2010/0125845 A1 | 5/2010 | Sugumar et al. | |
| 2010/0138693 A1* | 6/2010 | Ohkawa | 714/25 |
| 2011/0119670 A1 | 5/2011 | Sugumar et al. | |
| 2012/0324447 A1* | 12/2012 | Huetter et al. | 718/1 |
| 2013/0339663 A1* | 12/2013 | Chang et al. | 712/29 |
| 2014/0053019 A1* | 2/2014 | Holley et al. | 714/11 |
| 2014/0149752 A1* | 5/2014 | Brock et al. | 713/300 |
| 2014/0164827 A1* | 6/2014 | Swanson et al. | 714/10 |
| 2014/0282515 A1 | 9/2014 | Aslot et al. | |
| 2014/0282530 A1 | 9/2014 | Aslot et al. | |

OTHER PUBLICATIONS

Anonymous, "Power-RASH: A Unified Framework for Multi-Core Power Management Validation", IP.Com Prior Art Database, IP.Com No. IPCOM000207118D, Published May 17, 2011. http://priorartdatabase.com/IPCOM/000207118.

Anonymous, "The POWER Hypervisor (PHYP) to Thermal Power Management Device (TPMD) Communication in Support of Partition-Level and Multi-Node Power Management", IP.Com Prior Art Database, IP.Com No. IPCOM000221103D, Published Aug. 29, 2012. http://priorartdatabase.com/IPCOM/000221103.

U.S. Office Action for U.S. Appl. No. 13/798,423, Notification Date: Oct. 22, 2014.

* cited by examiner

MULTI-CORE RE-INITIALIZATION FAILURE CONTROL SYSTEM

FIELD

The present embodiments generally relate to a data processing system, and more specifically, to indeterminate core control during a multi-core re-initialization.

BACKGROUND

To meet the power management requirements of modern computers it may be common for idle cores of a processor to be completely turned off to save power. Powering off a core, however, eventually requires that the core be re-initialized similar to the way it was initialized at boot time. In some processors, an assist co-processor called a power-on reset (POR) engine may be used for re-initializing the cores of the system. The POR engine may consume very little energy in comparison to the cores of the computer system. The POR engine may request to bring a core back online by executing instructions from a re-initialization program stored in main memory that instructs the POR on how to properly re-initialize the core and introduce it back into a processing fabric.

SUMMARY

In one embodiment, a method of a computer system recovering from a core re-initialization failure is described. The method may include automatically detect a core re-initialization failure during a core re-initialization process by a hypervisor. The hypervisor automatically determines whether the core re-initialization failure is a permanent failure. If the core re-initialization failure is a permanent failure, then automatically determine, by the hypervisor, which cores are re-initialized and which cores are indeterminate. Automatically allocate the re-initialized cores between one or more virtual machines by the hypervisor.

In another embodiment, a core re-initialization system is described. The core re-initialization system includes a processor that includes a plurality of cores, a re-initialization logic element configured to re-initialize one or more cores of a multi-core processor in an idle mode, and an error capture register configured to capture an error code upon a re-initialization failure. It also includes a hypervisor, communicatively coupled with the processor. The hyperviser configured to detect the re-initialization failure, to determine from the error code of the error capture registers whether the re-initialization failure is a permanent failure, to determine which of the plurality of cores are initialized and which of the plurality of cores are indeterminate, and to allocate the re-initialized cores to one or more virtual machines.

In yet another embodiment, a computer readable storage medium having instructions stored thereon which, when executed, cause a processor to perform the following operations. Automatically detect a core re-initialization failure during a core re-initialization process. Automatically determine whether the core re-initialization failure is a permanent failure. If the core re-initialization failure is a permanent failure, automatically determine which cores are re-initialized and which cores are indeterminate. Automatically allocate the re-initialized cores between one or more virtual machines.

BRIEF DESCRIPTION OF THE DRAWINGS

Embodiments will be better understood from the following detailed description with reference to the drawings, in which.

DETAILED DESCRIPTION

Figure 1:
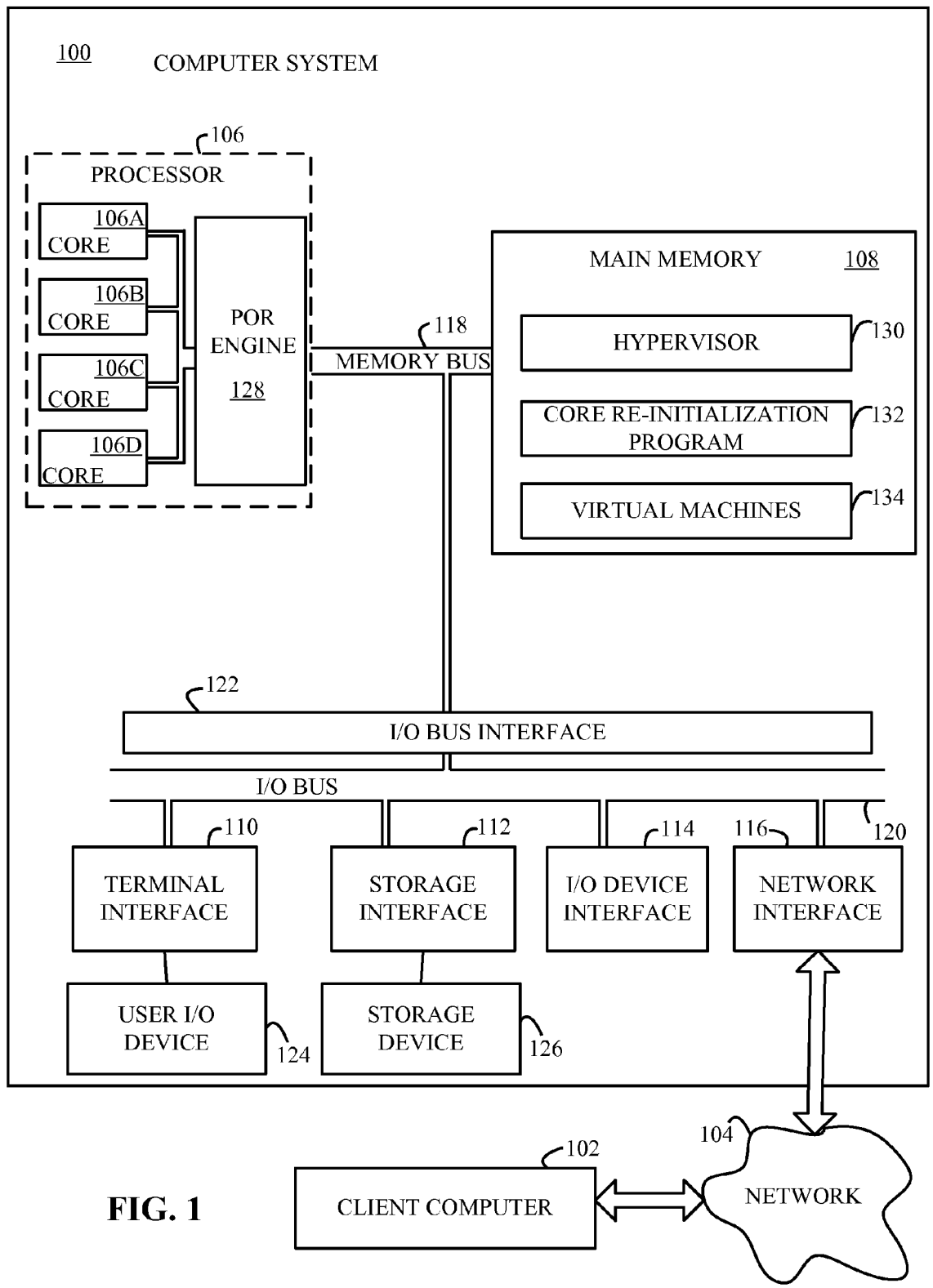
FIG. 1 depicts a high-level block diagram of an exemplary computer system for implementing an embodiment.

Power-on reset engines (POR engines) may accompany multi-core processors of a computer system. To meet power management requirements, multi-core processors may completely power off idle cores. When the cores are needed again to process data, they may be re-initialized similar to the way the core was initialized at boot time. A POR engine may be a specialized co-processor on a processor die that is used to re-initialize the cores by executing instructions from a core re-initialization program in a main memory of the computer system. The core re-initialization program and POR engine may properly re-initialize the idle cores and introduce them back onto a symmetric multi-processing (SMP) fabric of the computer system.

The cores may be in four different states. A core may be an initialized core, an idle core, a re-initialized core, or an indeterminate core. An initialized core may be a core that has been brought into the fabric upon start up. An idle core may be a core that has been powered down to save power when not in use. A re-initialized core may be a core that has be brought back to the fabric after being idle. An indeterminate core may be a failed core, a core that failed during re-initialization, or a core that cannot be re-initialized due to the re-initialization logic failing discussed further below.

The multi-core processors may be placed on computer systems that are virtualized servers. A hypervisor stored in memory on the systems may manage multiple virtual machines on a single processor by allocating processor resources to various virtual machines running on the virtualized server. Virtual machines often share physical machine resources. Each virtual machine may run its own operating system (typically called guest operating systems), which may be the same or different from each other. Virtual machines may allow multiple operating system environments to co-exist on the same computer, in isolation from each other. Virtual machines may provide an instruction set architecture that is somewhat different from that of the underlying physical machine or processor.

Some virtual machines are implemented as logical partitions in a logically-partitioned computer. Each logical partition in a logically-partitioned computer may comprise and utilize an OS (operating system), which controls the primary operations of the logical partition in the same manner as the operating system of a non-partitioned computer. Some or all of the operating systems may be the same or different from each other. Any number of logical partitions may be supported, and the number of the logical partitions resident at any time in the computer may change dynamically as partitions are added or removed from the computer. A hypervisor may add, remove, start, and/or shutdown logical partitions and may allocate resources to and deallocate resources from the logical partitions.

Each logical partition includes instructions that execute on the processor in a separate, or independent, memory space, and thus each logical partition may act as an independent, non-partitioned computer from the perspective of each application that executes in each such logical partition. As such, the applications typically do not require any special configuration for use in a logical partition environment.

While re-initializing the cores to run the virtual machines, re-initialization failures may occur. Some re-initialization failures may be due to a failure in the re-initialization logic element. An example of a re-initialization logic element is the POR engine. Other re-initialization failures may be due to an uncorrectable error in the memory containing the instructions of the POR engine, or the logic in the core that the POR engine is attempting to re-initialize to bring online to the processor fabric. If a re-initialization failure occurs during core re-initialization, it may render some or all of the processor cores useless or indeterminate such that none of the virtual machines may be run on the physical cores. One advantage of embodiments herein is to maintain the level of availability and reliability that is expected of virtualized servers with multi-core processors by using a control mechanism for determinate and indeterminate cores during the core re-initialization may be required to salvage core capacity for use by virtual machines.

Referring to the drawings, wherein like numbers denote like parts throughout the several views, FIG. 1 depicts a high-level block diagram representation of a server computer system 100 connected to a client computer system 102 via a network 104, according to an embodiment. The terms "server" and "client" are used herein for convenience only, and in various embodiments a computer system that operates as a client computer in one environment may operate as a server computer in another environment, and vice versa. The mechanisms and apparatus of embodiments apply equally to any appropriate computing system, including a computer system that does not employ the client-server model.

The major components of the computer system 100 may include one or more processors 106, a main memory 108, a terminal interface 110, a storage interface 112, an I/O (Input/Output) device interface 114, and a network interface 116, all of which may be communicatively coupled, directly or indirectly, for inter-component communication via a memory bus 118, an I/O bus 120, and an I/O bus interface unit 122.

The computer system 100 may contain one or more general-purpose programmable central processing units (CPUs) 106A, 106B, 106C, and 106D (also known as physical processor cores (cores)), herein generically referred to as the processor 106. In an embodiment, the computer system 100 may contain multiple processors 106 typical of a relatively large computer system 100. The processor may also include a re-initialization logic element, which a power-on reset (POR) engine 128 may be an example. The POR engine 128 may be a co-processor within the processor 106 that may re-initialize cores 106A-106D that have been powered off to save power while they are not in use. Each processor 106 may execute instructions stored in the main memory 108 and may include one or more levels of on-board cache.

In an embodiment, the main memory 108 may include a random-access semiconductor memory, storage device, or storage medium (either volatile or non-volatile) for storing or encoding data and programs. In another embodiment, the main memory 108 may represent the entire virtual memory of the computer system 100, and may also include the virtual memory of other computer systems coupled to the computer system 100 or connected via the network 104. The main memory 108 may be conceptually a single monolithic entity, but in other embodiments the main memory 108 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 108 is illustrated as containing the primary components utilized in the POR engine 128 recover mechanism for re-initializing the cores 106A-106D on the computer system 100, including a hypervisor 130, a core re-initialization program 132, and virtual machines 134. Although the hypervisor 130, the core-re-initialization program 132, and virtual machines 134 are illustrated as being contained within the memory 108 in the computer system 100, in other embodiments either, some, or all may be on different computer systems and may be accessed remotely, e.g., via the network 104. The computer system 100 may use virtual addressing mechanisms that allow the programs of the computer system 100 to behave as if they have access to a large, single storage entity instead of access to multiple, smaller storage entities. Thus, while the hypervisor 130, the core-re-initialization program 132, and virtual machines 134 are illustrated as being contained within the main memory 108, these elements are not necessarily completely contained in the same storage device at the same time. Further, although the hypervisor 130, the core-re-initialization program 132, and virtual machines 134 are illustrated as being separate entities, in other embodiments some of them, portions of some of them, or all of them may be packaged together.

Although the hypervisor 130, the core-re-initialization program 132, and virtual machines 134 are illustrated as being within the memory 108, in other embodiments, all or a portion of the hypervisor 130, the core-re-initialization program 132, and/or virtual machines 134 may be implemented in firmware or hardware. The hypervisor 130 may manage virtual machines 134 on the computer system 100. The hypervisor 130 may manage the virtual machines 134 by partitioning the resources of the computer system 100 for each virtual machine 134. The hypervisor 130 may perform both low-level partition management functions, such as page table management and may also perform higher-level partition management functions, such as creating and deleting partitions, concurrent I/O maintenance, and allocating/de-allocating processors, memory, and other hardware or program resources to/from the various partitions. The hypervisor 130 may control the allocation of the shared resources to the partitions and the access of the shared resources by the partitions, ensuring security and isolation of these partitions within the computer system 100. The hypervisor 130 may present the shared resources to the partitions as standalone resource, so that the partitions believe that they are the sole owner of the resource. In an embodiment, shared resources have a limited capacity to perform the operations of which it is requested. For example, a coprocessor may have a limited queue depth for performing operations.

In an embodiment, the hypervisor 130, the core re-initialization program 132, and virtual machines 134 may include instructions or statements that execute on the processor 106 or instructions or statements that may be interpreted by instructions or statements that execute on the processor 106, to carry out the functions as further described below with reference to FIGS. 2, 3, 4, and 5. In another embodiment, the hypervisor 130, the core-re-initialization program 132, and virtual machines 134 or all or some of these elements may be implemented in hardware via semiconductor devices, chips, logical gates, circuits, circuit cards, other physical hardware devices, or a combination of these devices in lieu of, or in addition to, a processor-based system. In an embodiment, the hypervisor 130, the core-re-initialization program 132, and virtual machines 134 or all or some of these elements may include data in addition to instructions or statements.

The memory bus 118 may provide a data communication path for transferring data among the processor 106, the main memory 108, and the I/O bus interface 122. The I/O bus interface 122 may be further coupled to the I/O bus 120 for transferring data to and from the various I/O units. The I/O bus interface unit 122 communicates with multiple I/O interface units 110, 112, 114, and 116, which may also be known as I/O processors (IOPs) or I/O adapters (IOAs), through the I/O bus 120.

The I/O interface units support communication with a variety of storage and I/O devices. For example, the terminal interface unit 110 supports the attachment of one or more user I/O devices 124, which may include user output devices (such as a video display device, speaker, or television set) and user input devices (such as a keyboard, mouse, keypad, touchpad, trackball, buttons, light pen, or other pointing device). A user may manipulate the user input devices utilizing a user interface, in order to provide input data and commands to the user I/O device 124 and the computer system 100, and may receive output data via the user output devices. For example, a user interface may be presented via the user I/O device 124, such as displayed on a display device, played via a speaker, or printed via a printer.

The storage interface 112 may support the attachment of one or more disk drives or direct access storage devices 126 (which are typically rotating magnetic disk drive storage devices, although they could alternatively be other storage devices, including arrays of disk drives configured to appear as a single large storage device to a host computer). In another embodiment, the storage device 126 may be implemented via any type of secondary storage device. The contents of the main memory 108, or any portion thereof, may be stored to and retrieved from the storage device 126 as needed. The I/O device interface 114 may provide an interface to any of various other input/output devices or devices of other types, such as printers or fax machines. The network interface 116 may provide one or more communications paths from the computer system 100 to other digital devices and computer systems 102; such paths may include, e.g., one or more networks 104.

Although the memory bus 118 is shown in FIG. 1 as a relatively simple, single bus structure providing a direct communication path among the processors 106, the memory 108, and the I/O bus interface 122, in fact the memory bus 118 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 122 and the I/O bus 120 are shown as single respective units, the computer system 100 may, in fact, contain multiple I/O bus interface units 122 and/or multiple I/O buses 120. While multiple I/O interface units are shown, which separate the system I/O bus 120 from various communications paths running to the various I/O devices, in other embodiments some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 104 may be any suitable bus, network or combination of networks and may support any appropriate protocol suitable for communication of data and/or code to/from the computer system 100 and the client computer 102. In various embodiments, the network 104 may represent a storage device or a combination of storage devices, either connected directly or indirectly to the computer system 100. In another embodiment, the network 104 may support wireless communications. In another embodiment, the network 104 may support hard-wired communications, such as a telephone line or cable. In another embodiment, the network 104 may be the Internet and may support IP (Internet Protocol). In another embodiment, the network 104 may be implemented as a local area network (LAN) or a wide area network (WAN). In another embodiment, the network 104 may be implemented as a hotspot service provider network. In another embodiment, the network 104 may be implemented as an intranet. In another embodiment, the network 104 may be implemented as any appropriate cellular data network, cell-based radio network technology, or wireless network. In another embodiment, the network 104 may be implemented as any suitable bus, combination of buses, network, combination of networks, or combination of networks and buses. Although one network 104 is shown, in other embodiments any number of networks (of the same or different types) may be present.

The client computer 102 may include some or all of the hardware and/or computer program elements of the computer system 100.

The various program components implementing various embodiments may be implemented in a number of manners, including using various computer applications, routines, components, programs, objects, modules, data structures, etc., and are referred to herein as "computer programs," or simply "programs."

The computer programs include one or more instructions or statements that are resident at various times in various memory and storage devices in the computer system 100 and that, when read and executed by one or more processors in the computer system 100, or when interpreted by instructions that are executed by one or more processors, cause the computer system 100 to perform the actions necessary to execute steps or elements including the various aspects of embodiments. Aspects of embodiments may be embodied as a system, method, or computer program product. Accordingly, aspects of embodiments may take the form of an entirely hardware embodiment, an entirely program embodiment (including firmware, resident programs, micro-code, etc., which are stored in a storage device), or an embodiment combining program and hardware aspects that may all generally be referred to herein as a "circuit," "module," or "system." Further, embodiments may take the form of a computer program product embodied in one or more computer-readable medium (s) having computer-readable program code embodied thereon.

Any combination of one or more computer-readable medium(s) may be utilized. The computer-readable medium may be a computer-readable signal medium or a computer-readable storage medium. For example, a computer-readable storage medium may be, but not limited to, an electronic, magnetic, optical, electromagnetic, infrared, or semiconductor system, apparatus, or device, or any suitable combination of the foregoing. More specific examples (an non-exhaustive list) of the computer-readable storage media may include: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may include a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which includes one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments may also be delivered as part of a service engagement with a client corporation, nonprofit organization, government entity, or internal organizational structure. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described herein may be identified based upon the application for which they are implemented in a specific embodiment. But, any particular program nomenclature used herein is used merely for convenience, and thus embodiments are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments.

Figure 2:
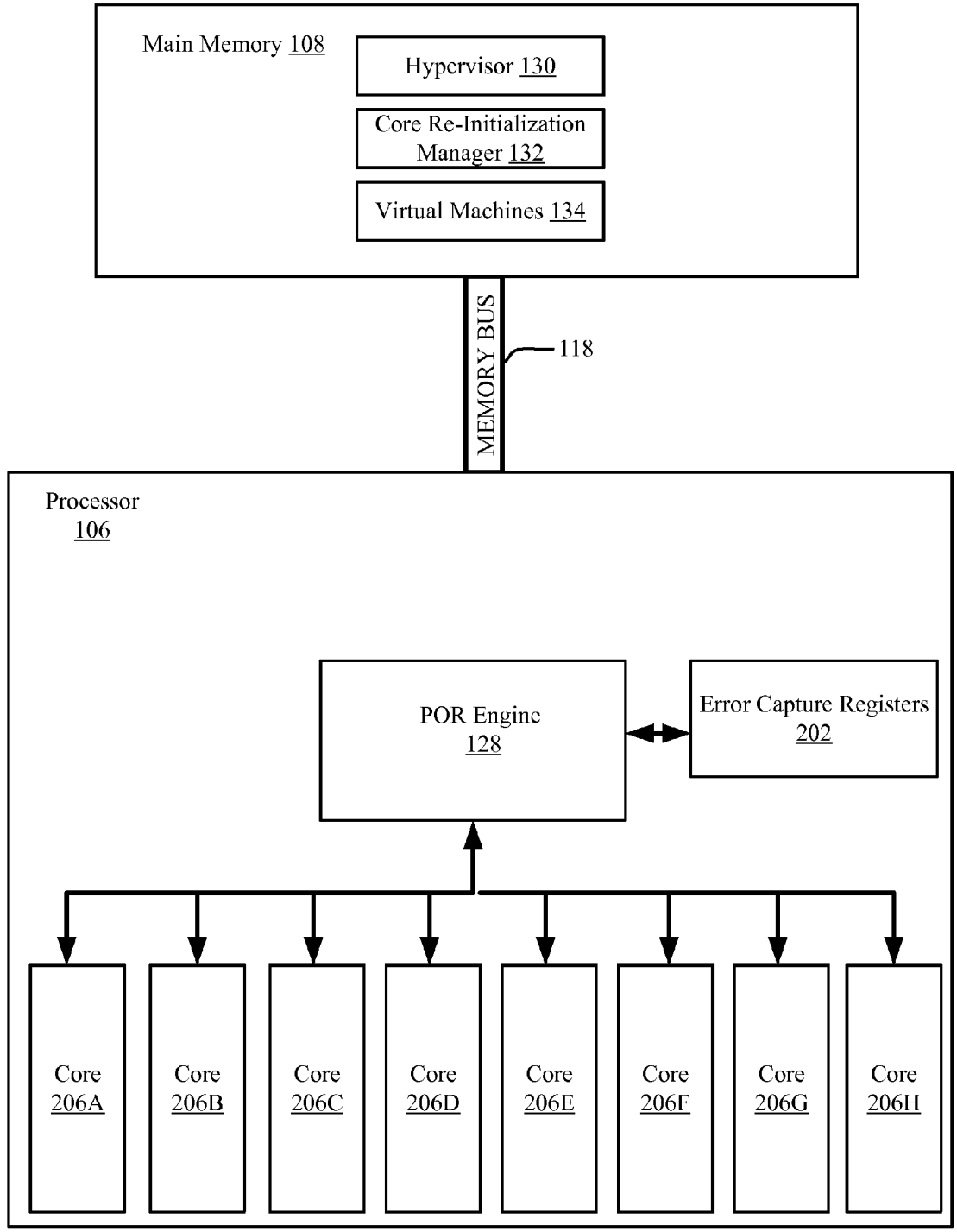
FIG. 2 depicts a block diagram of a core re-initialization system, according to an embodiment.

Referring to FIG. 2, a more detailed block diagram the computer system 100 (FIG. 1) is illustrated showing a core re-initialization system of according to an embodiment. The core re-initialization system may include the processor 106 and the main memory 108 of FIG. 1. The processor 106 and the main memory 108 may be in communication with each other through the memory bus 118. The main memory 108 may include the hypervisor 130, the core-re-initialization program 132, and virtual machines 134. The processor 106 may include eight cores 206A-206H, the POR engine 128, and error capture registers 202.

In operation, the processor 106 may have multiple cores, in this example eight (cores 206A-206H). To meet power management requirements of the computer system 100, the cores 206A-206H may be completely powered off while idle. Completely powering off a core will require that it be re-initialized when needed. The re-initialization of the core may be similar to the way the core was initialized at boot time. This process is managed by the POR engine 128.

The POR engine 128 may be a small, specialized co-processor on the processor 106 to re-initialize the cores 206A-206H. The POR engine 128 may respond to requests to bring a core back online by executing instructions stored on the main memory 108 from the core re-initialization program 132. Other re-initialization logic elements besides the POR engine 128 may also be included in the core re-initialization system.

In some cases, re-initialization of the cores 206A-206H is prevented by a re-initialization failure. The re-initialization failure may be captured in error capture registers 202, which may be located on the processor 106 or the POR engine 128, for example. The hypervisor 130 may inspect the error capture registers 202 after receiving notification from the system 100 (via an interrupt) that something has failed. Additional logic may be used to store the re-initialization values in the error capture registers 202. The values contained in the error capture registers 202 may allow the hypervisor 130 to determine what specifically has gone wrong (the bits within the register may have specific meanings) and which system components (the POR engine 128, cores 206A-206H, other re-initialization logic elements, or core re-initialization program 132) are impacted. The hypervisor 130 may also determine the type of failure. For example, the hypervisor 130 may determine whether the failure is due to a transient failure (soft error) or permanent failure (hard error). One way of determining whether there is a soft error or hard error is by re-initializing the POR engine 128 again and re-initializing the cores for a second time. If the same failure occurs, then the failure may very likely be a hard error. The hypervisor 130 may also determine which core or cores were in the process of re-initializing when the failure occurred and which cores have not been re-initialized.

After determining the cause of the failure and the type of failure, the hypervisor 130 may determine which cores are indeterminate, meaning they are no longer usable by the computer system 100. The cause of failure and the type of failure may determine which cores are the indeterminate cores. If the failure is a transient failure, then the POR engine 128 may be re-initialized by the hypervisor 130 to attempt the core re-initialization again. If the failure is a permanent failure then the hypervisor 130 may determine which cores 206A-206H are indeterminate. If the hard failure is caused by a problem with the core being processed by the POR engine 128 and not the POR engine 128, then only the core or cores that experienced the failure may be considered indeterminate. If the permanent failure is due to the POR engine 128 or the core re-initialization program 132, then the POR engine 128 is considered indeterminate by the hypervisor 130. The set of indeterminate cores may be all of the cores 206A-206H, if none of them were re-initialized before the re-initialization failure, or the set of indeterminate cores may be a core or cores that were currently being re-initialized, as well as any cores that are currently idled on the processor 106 since the POR engine 128 may not be available to re-initialize them should they need to be powered-on in the future.

After determining which cores are indeterminate cores, the hypervisor 130 may allocate the remaining processing resources to one or more virtual machines 134 managed by the hypervisor 130. The hypervisor 130 will try to improve the usage of the remaining initialized cores and try to accommodate as many virtual machines 134 as possible. If there is excess processor capacity that is not assigned to virtual machines after determining the number of failed cores, then the one or more failed cores may simply be considered indeterminate and the processor capacity of the computer system 100 may be reduced.

If there is not excess capacity available, then action may be taken to reduce and reallocate core resources to the virtual machines 134. The hypervisor 130 may consider several factors in determining how to allocate the remaining cores to the virtual machines 134. The hypervisor 130 may use an availability priority assigned to each virtual machine 134. The availability priority may be assigned to the virtual machine when created, for example. The more important virtual machines 134 may be ranked with a high availability priority while the less important virtual machines 134 may be ranked with a low availability priority. Based on the availability priority of the virtual machine 134 the hypervisor 130 may selectively reduce the capacity of the less important virtual machines 134 to maintain a capacity guarantee of each of the most important virtual machines 134. The capacity guarantee may be the minimal amount of processing power to run a virtual machine 134. If reducing the capacity of the less important virtual machines 134 does not maintain the capacity guarantees or causes a threshold of inefficiency in the higher ranked virtual machines 134, then the least important virtual machines 134 may be terminated to accommodate the capacity guarantees of the higher priority virtual machines 134.

Other factors the hypervisor 130 may take into consideration when allocating the remaining cores to the virtual machines 134, besides the availability priority assigned to each virtual machine 134, may be the number of indeterminate cores and the number of cores each virtual machine uses. For example, if two cores are indeterminate in a four core processor 106, and there are three virtual machines with equal availability priority but one virtual machine uses two cores, then the virtual machine with two cores of capacity may be terminated to reduce the number of impacted virtual machines. In another embodiment, a combination of availability priority and minimal virtual machine termination may be used together or separately to allocate core capacity to virtual machine processing needs.

Figure 3:
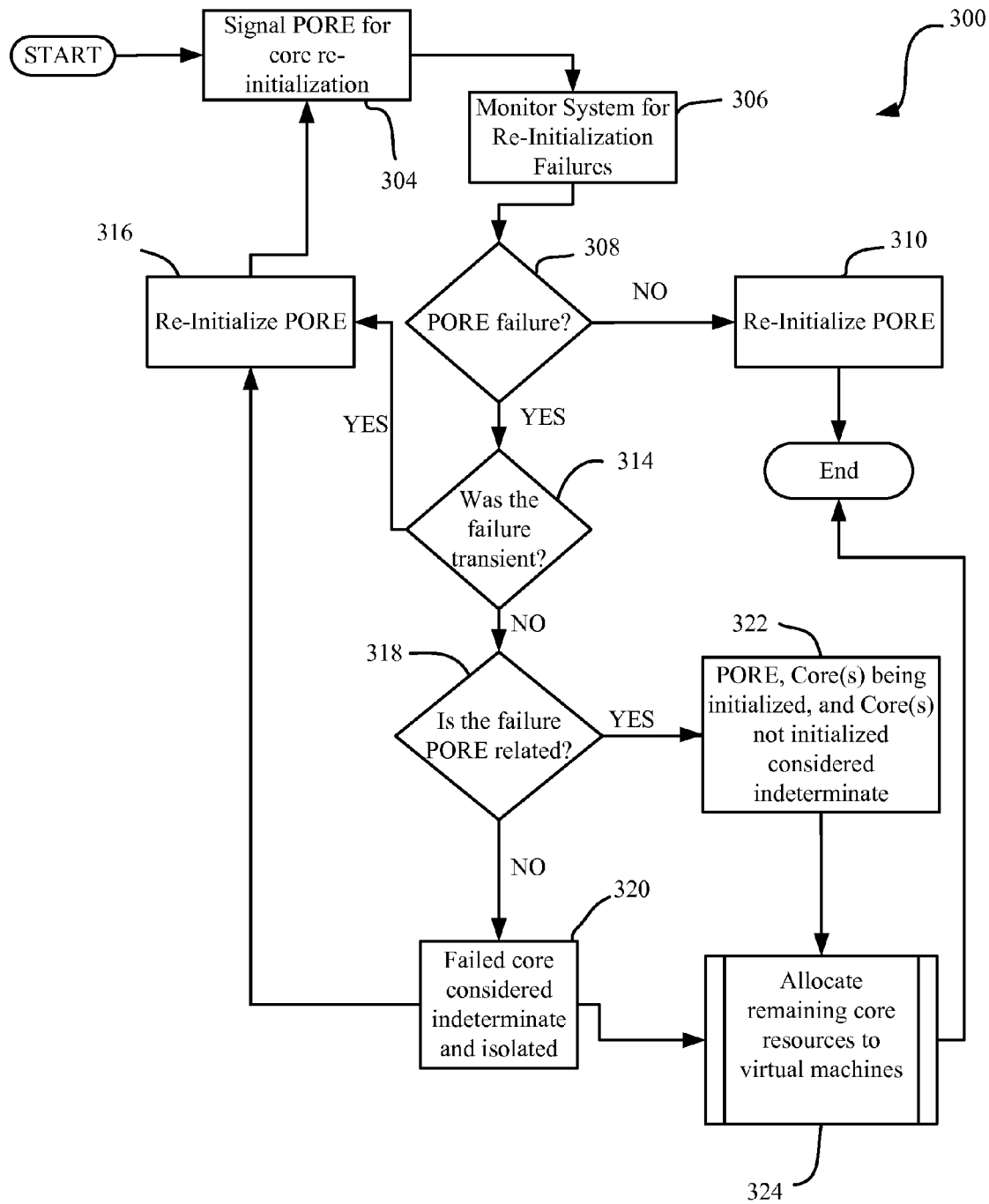
FIG. 3 depicts a method of indeterminate core control during core re-initialization, according to an embodiment.

Referring now to FIG. 3, according to an embodiment, a block diagram of a method 300 of indeterminate core control during a multi-core re-initialization is illustrated. In operation 304, the method 300 begins when the POR engine 128 is signaled to re-initialize the cores 206A-206H by the core re-initialization program 132. In operation 306, the hypervisor 130 monitors the error capture registers 202 for re-initialization failures during core re-initialization. In operation 308, the hypervisor 130 determines whether or not there is a re-initialization failure. In operation 308, if there were no re-initialization failures, then in operation 310 the POR engine 128 re-initializes for the next core re-initialization. If the hypervisor 130 detects a re-initialization failure, then in operation 314, the hypervisor 130 may determine whether the failure was a transient failure or a permanent failure. If the failure was a transient failure, then in operation 316 the POR engine 128 re-initializes and in operation 304, the POR engine 128 is signaled by the core re-initialization program 132 to retry the core re-initialization by the POR engine 128.

If the failure is not transient but a permanent failure, then in operation 318, it is determined whether the re-initialization failure is related to the POR engine 128 including the core re-initialization program 132. If the failure is not related to the POR engine 128, then it may be related to a failure with the core or cores that were being re-initialized. In operation 320, the failed core may be considered indeterminate and isolated from the system by the hypervisor 130. In operation 316, the POR engine 128 is re-initialized, and the POR engine 128 is signaled again in operation 304 to perform core re-initialization of the remaining cores that have not been re-initialized. In operation 324, the hypervisor 130 allocates the remaining core capacity to virtual machines 134.

If, in operation 318, the failure is related to the POR engine 128, in that the POR engine 128 experienced a failure in its logic or there is a permanent failure in the memory 108 containing the instructions of the POR engine 128, then the POR engine 128, the core or cores being initialized during the failure, and the cores not initialized are considered indeterminate. The processor 106 may also not go into a power saving state again since the POR engine 128 is considered indeterminate. If any of the cores were initialized prior to the failure, then in operation 324 the hypervisor 130 may allocate the remaining core processing capacity to the virtual machines 134.

Figure 4:
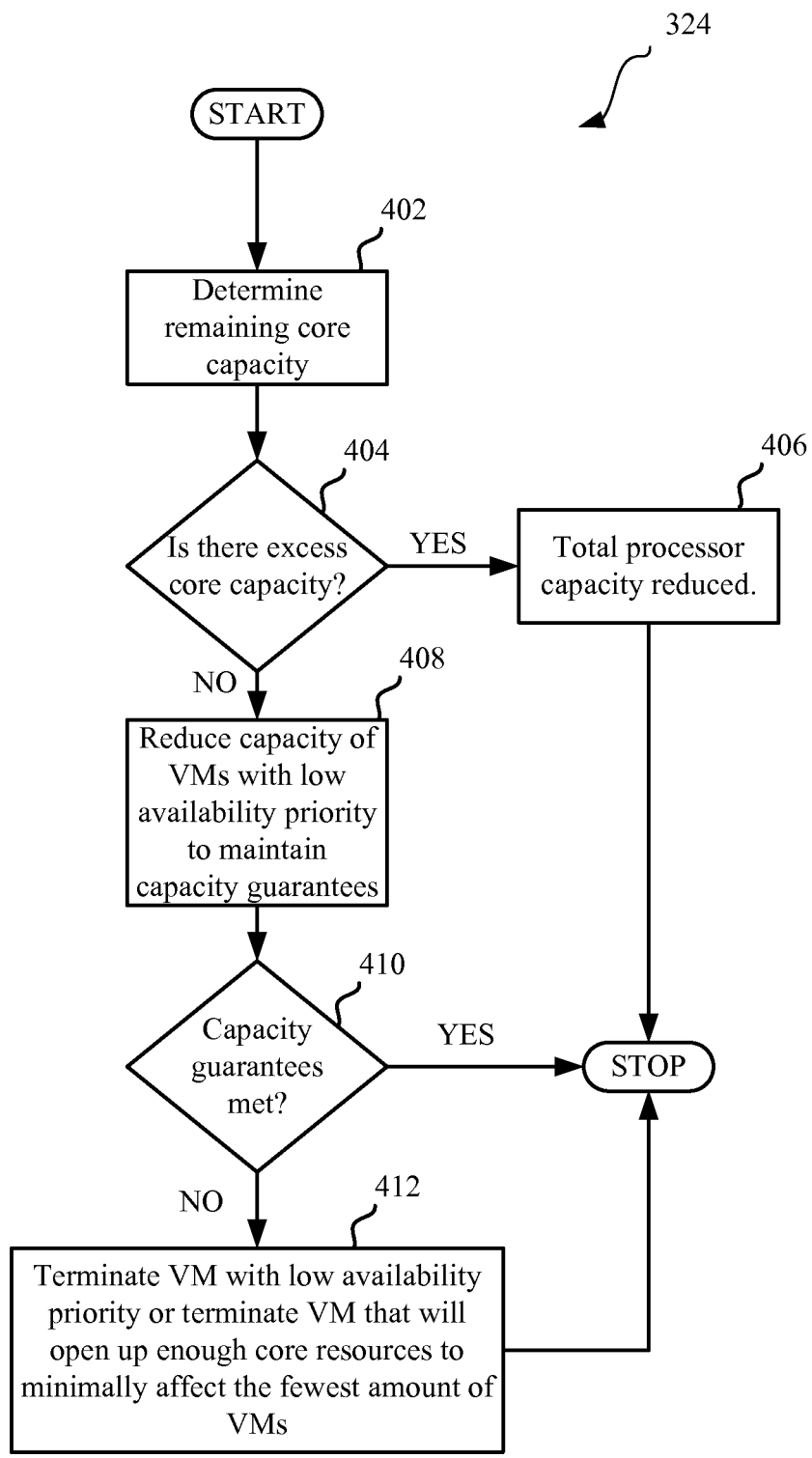
FIG. 4 depicts an operation of the method of FIG. 3 for allocating re-initialized core resources to virtual machines, according to an embodiment.

Referring now to FIG. 4, according to an embodiment, a flow chart of operation 324 of FIG. 3 is illustrated. In operation 402, the hypervisor 130 may determine the remaining capacity of the processor 106 by determining how many cores of the cores 206A-206H remain initiated. If all of the cores 206A-206H are indeterminate, the entire processor 106 may be considered indeterminate and unusable. If there is core capacity remaining, then in operation 404 it may be determined whether there is excess core capacity in relation to the core capacity needed for the virtual machines 134 being managed by the hypervisor 130. In operation 406, if there is excess core capacity, then the total processor capacity may be reduced. If there is not excess core capacity, then allocating the remaining core capacity to the requirements of the virtual machines 134 may be done by the hypervisor 130. The virtual machines 134 may be assigned an availability priority from least critical to the most critical virtual machine. In operation 408, the hypervisor 130 may reduce the capacity of the virtual machines 134 with the lowest availability priority to maintain capacity guarantees of all virtual machines 134. If the capacity guarantees are met, then operation 324 may be ended. If the capacity guarantees are not met, then virtual machines 134 may be terminated based on their availability priority, the least amount of virtual machines 134 affected, or both. For example, if two cores are indeterminate in a four core processor 106, and there are three virtual machines 134 with equal availability priority but one virtual machine 134 uses two cores, then the virtual machine 134 with two cores of capacity may be terminated to keep the number of impacted virtual machines 134 to a minimum. The allocation of core capacity to virtual machines may be system specific.

Figure 5:
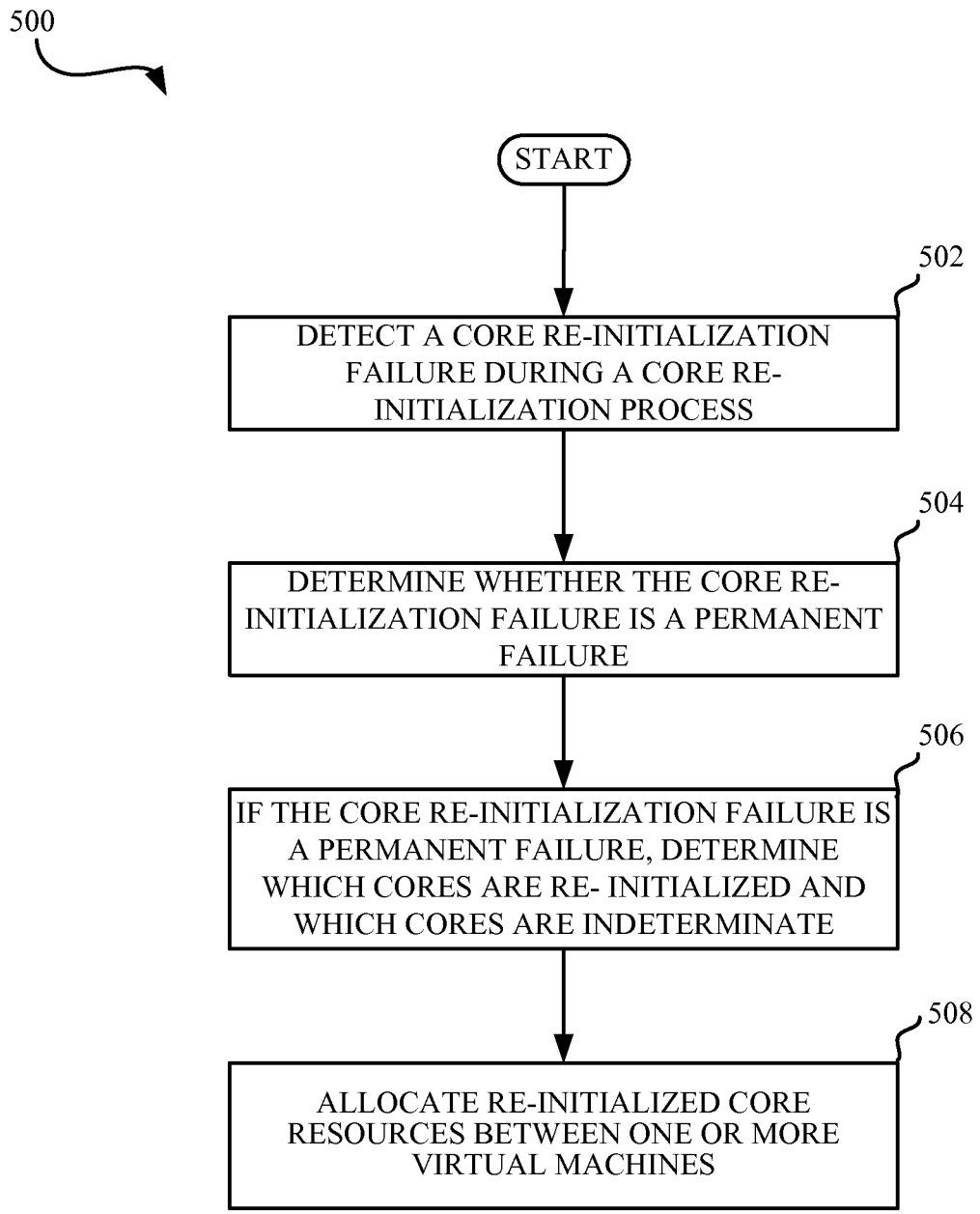
FIG. 5 depicts another method of indeterminate core control during core re-initialization, according to an embodiment.

Referring now to FIG. 5, a flowchart of a method 500 is illustrated for indeterminate core control during a multi-core re-initialization. In operation 502, the hypervisor 130 may detect a core re-initialization failure during a core re-initialization process. In operation 504, the hypervisor 130 may determine whether the core re-initialization failure is a permanent failure or a transient failure. If, in operation 506, the re-initialization failure is a permanent failure, then the hypervisor 130 may determine which cores are re-initialized and which cores are indeterminate. In operation 508, the hypervisor 130 may allocate the remaining re-initialized core resources to virtual machines 134 on the system.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments. But, embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

What is claimed is:

1. A method of controlling a core re-initialization failure of a multi-core processor comprising:
    automatically detecting a core re-initialization failure during a core re-initialization process by a hypervisor;
    automatically determining whether the core re-initialization failure is a permanent failure by the hypervisor;
    if the core re-initialization failure is a permanent failure, automatically determining by the hypervisor which cores are re-initialized and which cores are indeterminate; and
    automatically allocating the re-initialized cores between one or more virtual machines by the hypervisor.

2. The method of claim 1, wherein automatically allocating the re-initialized cores between one or more virtual machines by the hypervisor includes:
    at the hypervisor, automatically determining a re-initialized core capacity;
    at the hypervisor, automatically determining a capacity of a first virtual machine having a virtual machine capacity guarantee; and
    at the hypervisor, automatically reducing a capacity of the one or more virtual machines with a low availability priority if the re-initialized core capacity does not meet the virtual machine capacity guarantee of the first virtual machine.

3. The method of claim 2, further comprising:
at the hypervisor, automatically terminating one or more virtual machines to meet the virtual machine capacity guarantees of the first virtual machine.

4. The method of claim 3, wherein the terminating one or more virtual machines includes terminating one or more virtual machines to open up enough core resources to meet the virtual machine capacity guarantees of the greatest number of virtual machines.

5. The method of claim 1, wherein automatically determining by the hypervisor which cores are re-initialized and which cores are indeterminate includes determining whether the permanent failure is related to a re-initialization logic element, if the permanent error is related to the re-initialization logic element, then the core being re-initialized and remaining uninitialized cores are considered indeterminate, if the permanent failure is not related to the re-initialization logic element and related to the core being re-initialized, then the core being re-initialized may be considered indeterminate.

6. The method of claim 5, wherein the re-initialization logic element is a power-on reset (POR) engine.

7. The method of claim 1, further comprising:
at the hypervisor, automatically re-starting the core re-initialization process to re-initialize the uninitialized cores if the core re-initialization failure is not a permanent failure or if one or more cores are the cause of the permanent failure.

* * * * *